US009713339B2

(12) United States Patent
Melliou et al.

(10) Patent No.: US 9,713,339 B2
(45) Date of Patent: Jul. 25, 2017

(54) METHOD FOR DEBITTERING OLIVES

(71) Applicant: The Regents of the University of California, Oakland, CA (US)

(72) Inventors: Eleni Melliou, Ambelakia (GR); Alyson Mitchell, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/921,349

(22) Filed: Oct. 23, 2015

(65) Prior Publication Data

US 2016/0037806 A1 Feb. 11, 2016

Related U.S. Application Data

(63) Continuation of application No. PCT/US2014/035186, filed on Apr. 23, 2014.

(60) Provisional application No. 61/816,500, filed on Apr. 26, 2013.

(51) Int. Cl.
| | |
|---|---|
| *A23L 1/015* | (2006.01) |
| *A23L 1/212* | (2006.01) |
| *A23L 5/20* | (2016.01) |
| *A23L 11/30* | (2016.01) |
| *A23L 19/00* | (2016.01) |

(52) U.S. Cl.
CPC .............. *A23L 1/015* (2013.01); *A23L 5/20* (2016.08); *A23L 11/30* (2016.08); *A23L 19/00* (2016.08); *A23L 19/03* (2016.08); *A23V 2002/00* (2013.01); *A23V 2300/02* (2013.01)

(58) Field of Classification Search
CPC .......... A23L 1/015; A23L 1/2123; A23L 5/20; A23L 11/30; A23L 19/00; A23L 19/03; A23V 2300/02; A23V 2002/00
See application file for complete search history.

(56) References Cited

U.S. PATENT DOCUMENTS

| | | | |
|---|---|---|---|
| 5,817,354 A | 10/1998 | Mozaffar et al. | |
| 5,837,304 A * | 11/1998 | Jepson | A23L 1/2123 426/270 |
| 5,998,641 A | 12/1999 | Ganguli et al. | |
| 6,187,356 B1 | 2/2001 | van Buuren et al. | |
| 6,197,308 B1 | 3/2001 | Crea et al. | |
| 6,358,542 B2 | 3/2002 | Cuomo et al. | |
| 6,361,803 B1 | 3/2002 | Cuomo et al. | |
| 6,444,730 B1 * | 9/2002 | Brueggemann | C05F 5/002 523/123 |
| 6,740,778 B2 | 5/2004 | Kuno et al. | |
| 6,849,770 B2 | 2/2005 | Guzman et al. | |
| 6,906,100 B2 | 6/2005 | Fotinos et al. | |
| 6,936,287 B1 | 8/2005 | Crea et al. | |
| 6,942,890 B1 * | 9/2005 | van Buuren | A23D 7/0056 426/417 |
| 7,306,815 B2 | 12/2007 | Gourdin et al. | |
| 2002/0004077 A1 | 1/2002 | Cuomo et al. | |
| 2008/0014322 A1 | 1/2008 | Ibarra et al. | |
| 2010/0184868 A1 | 7/2010 | López Más et al. | |
| 2010/0286376 A1 | 11/2010 | Lang et al. | |
| 2012/0045406 A1 | 2/2012 | Urban et al. | |

FOREIGN PATENT DOCUMENTS

| | | |
|---|---|---|
| EP | 0933419 B1 | 1/2003 |
| WO | 2009/106669 | 9/2009 |
| WO | 2013/021356 | 2/2013 |

OTHER PUBLICATIONS

International Application No. PCT/US2014/035186, "International Search Report", mailed Aug. 28, 2014, 8 pages.

\* cited by examiner

*Primary Examiner* — Anthony Weier
(74) *Attorney, Agent, or Firm* — Mintz Levin Cohn Ferris Glovsky and Popeo P.C.

(57) ABSTRACT

A method for debittering olives is described. The method includes contacting olive flesh with a granular polymeric resin under conditions sufficient to remove one or more bittering compounds from the olive flesh, thereby debittering olives.

28 Claims, 2 Drawing Sheets

METHOD FOR DEBITTERING OLIVES

CROSS-REFERENCES TO RELATED APPLICATIONS

This application is a continuation of International Patent Application No. PCT/US2014/035186 filed Apr. 23, 2014, which claims priority to U.S. Application No. 61/816,500, filed Apr. 26, 2013, which applications are incorporated herein by reference in their entirety for all purposes.

BACKGROUND OF THE INVENTION

Olive curing typically involves the removal of bitter-tasting compounds, such as secoiridoids and polyphenols, from harvested olive fruit. Removal of the bittering compounds provides desirable food products from fruit that would be otherwise unpalatable to most consumers. Traditionally, curing processes are conducted using aqueous brine solutions containing lye (i.e., sodium hydroxide), salt (i.e., sodium chloride), and other agents to remove the bittering compounds from the olives. These methods are characterized by disadvantages including high volumes of contaminated wastewater, extended extraction times (up to months), high levels of sodium in the resulting food products, and the presence of certain carcinogens in the products. Accordingly, new processing methods are needed to address these disadvantages. Surprisingly, the present invention meets these and other needs.

BRIEF SUMMARY OF THE INVENTION

The present invention provides a method for debittering olives. The method includes contacting olive flesh with a granular polymeric resin under conditions sufficient to remove one or more bittering compounds from the olive flesh, thereby debittering olives. In some embodiments, the contacting step is performed under conditions that are substantially free of water.

DETAILED DESCRIPTION OF THE INVENTION

I. General

Figure 1:
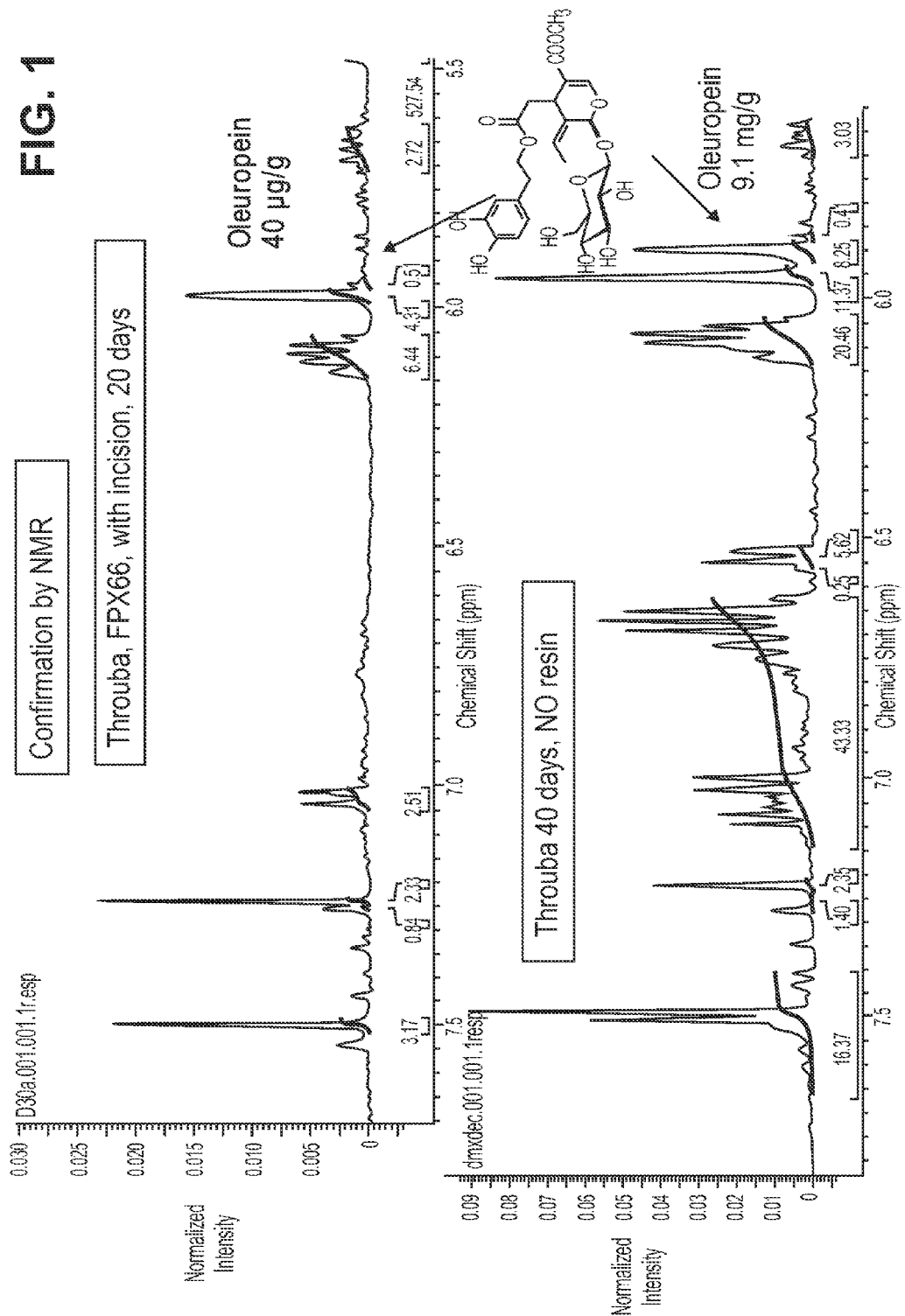
FIG. 1 shows oleuropein levels, as assessed by NMR, in olives treated with FPX66 resin for 20 days (top spectrum) as compared to olives treated with no resin for 40 days (bottom spectrum).

The invention described herein provides a new method to debitter olives. The method employs absorbent resins to remove bitter compounds, such as polyphenols and other phenolics, from olives. Surprisingly, it was discovered that bittering compounds are able to diffuse from olive flesh in the absence of a fluid carrier such as an aqueous brine. Accordingly, the debittering process can be conducted in the absence of large amounts of water which provides several advantages.

This method allows for controlling the levels of the remaining polyphenols and secoiridoids in the edible olive fruit, and producing a polyphenol-enriched olive extract for use as an food ingredient or supplement. Importantly, the method described can decrease the use of sodium hydroxide used in olive fruit processing and the high volume of heavily contaminated wastewater that results from olive processing. The method can provide food products, such as California-style Black Ripe olives, with lower levels of sodium than products that are processed by conventional methods.

II. Definitions

As used herein, the term "olive" refers to the fruit of the species *Olea europaea*, its subspecies, and its cultivars. "Olive flesh" refers to any portion of the olive fruit, including the exocarp or peel, the mesocarp or pith, the endocarp, and the seed or pit. Olives can be whole olives (with or without pits), slices, particles, or other cut forms. Olives can be pulped or mashed.

As used herein, the term "debittering" refers to removing a portion of one or more bittering compounds from olive flesh. In general, removal of the compounds results in a food product that is palatable to a consumer (i.e. not unpleasantly bitter). The extent of debittering can depend on the desired taste of the food product, or the desired quantity of bittering compound to be isolated from the olive flesh.

As used herein, the term "bittering compound" refers to a compound that has a bitter flavor. The bitter flavor can be pleasant or unpleasant, depending on the subject taste of an individual consumer or the amount of the compound that is present in a food such as an olive. Examples of bittering compounds contained in olive fruit include, but are not limited to, phenols, polyphenols, and secoiridoids. Bittering compounds include, for example, oleuropein (i.e., (4S,5E,6S)-4-[2-[2-(3,4-dihydroxyphenyl)ethoxy]-2-oxoethyl]-5-ethylidene-6-[[(2S,3R,4S,5S,6R)-3,4,5-trihydroxy-6-(hydroxymethyl)-2-tetrahydropyranyl]oxy]-4H-pyran-3-carboxylic acid, methyl ester), ligstroside, methyl oleoside, and hydroxytyrosol.

As used herein, the term "phenol" refers to a molecule containing at least one hydroxyphenyl moiety. Phenols include, but are not limited to, phenol, pyrocatechol, resorcinol, pyrogallol, and phloroglucinol. The term "polyphenol" refers to a molecule containing at least two hydroxyphenyl moieties. The hydroxyphenyl groups can be substituted with one more functional groups including hydroxy, carboxy, alkyl, and alkoxy.

As used herein, the term "hydroxy" refers to a moiety having a structure —OH.

As used herein, the term "alkyl," by itself or as part of another substituent, refers to a saturated hydrocarbon moiety. Alkyl moieties can include branched or straight carbon chains. In general, alkyl groups contain 1-20 carbon atoms.

As used herein, the term "alkoxy" refers to a moiety having a structure —O-alkyl, wherein alkyl is defined as above.

As used herein, the term "carboxy" refers to a moiety having a structure —C(O)—OR, wherein R is H or alkyl.

As used herein, the term "secoiridoid" refers to a monoterpene-type natural product found in olive flesh. In general, a secoiridoid contains a 3,4-dihydro-2H-pyran-2-ol moiety. The 2-hydroxy group in the pyran-2-ol moiety can be glycosylated with a sugar molecule. Examples of secoiridoids contained in olives include, but are not limited to, oleuropein, oleuropein-aglycone, oleuropein-3"-methyl ether, 7"S-hydroxyoleuropein, jaspolyanoside, ligustroside 3'-O-β-d-glucoside, jaspolyoside, isojaspolyoside A, and oleuropein 3'-O-β-d-glucoside.

As used herein, the terms "contacting" and "mixing" refer to forming a mixture containing at least two components such that the components are physically touching each other.

As used herein, the term "removing" refers to isolating a portion of at least one component from a mixture containing two or more components, such that the level of the component in the remaining mixture is reduced. Any portion of the compound can be removed from a mixture, including the entirety of the component. In certain instances, the remaining mixture can be free or substantially free of the removed component.

As used herein, the term "incising" refers to piercing, puncturing, or otherwise cutting the surface layer of a whole olive fruit.

As used herein, the term "granular polymeric resin" refers to a composition containing one or more polymers in solid, particulate form. In general, the polymer particles range in size from a few microns in diameter to a few millimeters in diameter. Examples of commercially available granular polymeric resins include, but are not limited to, Amberlite XAD4, XAD7, and XAD16 resins, FPX66, and Kollidon resins. Preferred resins include porous particles.

As used herein, the term "polystyrene/poly(divinylbenzene)" refers to a polystyrene-based polymer that contains cross-linked chains resulting from the participation of divinylbenzene monomers in the polymerization reaction used to produce the polymer.

As used herein, the term "acrylic ester" refers to an acrylate-based polymer that contains cross-linked chains resulting from esterification of acrylic acid sidechains with suitable diols.

As used herein, the term "polyvinylpolypyrrolidone" refers to physically or chemically cross-linked N-vinyl-2-pyrrolidinone homopolymer.

As used herein, the term "average pore diameter" refers to the mean outer diameter of pores present in the particles of a granular polymeric resin.

As used herein, the term "particle size" refers to the average diameter of the particles in a granular polymeric resin.

As used herein, the term "freezing" refers to reducing the temperature of olive flesh such that the water present in the olive flesh solidifies (i.e., freezes). Thawing refers to melting water in frozen olive flesh.

As used herein, the term "replacing" refers to exchanging a portion of polymeric resin containing adsorbed bittering compounds with a portion of polymeric resin not containing adsorbed bittering compounds.

As used herein, the term "filtering" refers to the process of passing a mixture through a porous member (i.e., a filter), wherein the pores in the member are sufficiently small to prevent at least a portion of one component in the mixture from passing through the member.

As used herein, the term "polar solvent" refers to a substance that is a liquid at ambient temperature and pressure and is characterized by a dielectric constant equal to or greater than about 5. Examples of polar solvents include, but are not limited to, ethanol, isopropanol, propylene glycol, glycerol, and water.

As used herein, the term "substantially free of water" refers to a process conducted in the absence of added water. "Substantially free of water" is meant to allow for small amounts of incident water, such as atmospheric moisture, residual water from washing steps in a process, and condensation formed during freezing/thawing steps. Incident water also includes water that is naturally present in olives.

III. Method for Debittering Olives

The present invention provides a method for debittering olives. The method includes contacting olive flesh with a granular polymeric resin under conditions sufficient to remove one or more bittering compounds from the olive flesh, thereby debittering olives.

Any type of olive can be debittered using the methods of the present invention, including known varieties and varieties that may be developed in the future. In general, the olives contemplated for use in the methods of invention include *Olea europaea* olives and subspecies thereof. Subspecies include *europaea, cuspidate, guanchica, cerasiformis, maroccana*, and *laperrinei*. Suitable olives include, but are not limited to, ascolano, barouni, cailletier, frantoio, kalamata, lucques, manzanillo, Mission, and sevillano olives. In some embodiments, the olives are California-style black ripe olives.

The methods of the invention are suitable for debittering olive flesh in a number of forms. The olives can contain pits, for example, or be pitted to remove the olive pits. The olives can vary with respect to ripeness. The olives can be whole, cut, chopped, sliced, diced, crushed, pulped, pressed, or otherwise mechanically processed. Accordingly, some embodiments of the invention provide methods for debittering olives as described above wherein the olive flesh includes whole olives. In some embodiments, the olive flesh comprises olive slices. In some embodiments, the olive flesh comprises coarse olive particles.

The methods of the invention can be used to remove a variety of bittering compounds from olive flesh. In general, the bittering compounds are phenols, polyphenols, or secoiridoids. Examples of bittering compounds include, but are not limited to, oleuropein, ligstroside, oleoside, tyrosol, hydroxytyrosol, caffeic acid, and vanillic acid. The quantity of a given compound will depend, in part, on the subspecies or cultivar of the olives used in the method as well as the level of ripeness of the olives. In some embodiments, the invention provides methods for debittering olives as described above wherein the one or more bittering compounds are selected from phenols, polyphenols, and secoiridoids. In some embodiments, the one or more bittering compounds are selected from oleuropein, ligstroside, oleoside, and mixtures thereof. In some embodiments, the one or more bittering compounds include hydroxytyrosol.

Several commercially-available polymeric resins can be used in the methods of the invention. In general, the resins used in the methods of the invention are capable of adsorbing the bittering compounds present in the olive flesh. The resins can have pores of varying diameter, and the resin particles can vary with respect to particle size (i.e., average diameter). Poly(divinylbenzene) cross-linked macroreticular polystyrene resins, phenol-formaldehyde condensate polymer resins, acrylic ester resins, and polyvinylpolypyrrolidone resins can be used in the methods of the invention. Suitable resins include, but are not limited to, Amberlite XAD4, XAD7, and XAD16 resins as well as Kollidon resins. In some embodiments, the granular polymeric resin is selected from a polystyrene/poly(divinylbenzene) resin, an acrylic ester resin, and a polyvinylpolypyrrolidone resin. In some embodiments, the granular polymeric resin has an average pore diameter of from about 40 angstroms to about 100 angstroms. The granular polymeric resin can have an average pore diameter of, for example, about 40, 45, 50, 55, 60, 65, 70, 75, 80, 85, 90, 95, or 100 angstroms. In some embodiments, the granular polymeric resin has a particle size of from about 0.2 mm to about 2 mm. The particle size can be, for example, about 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2 mm.

The granular polymeric resin and the olive flesh are kept in contact for any amount of time sufficient to remove the desired amount of bittering compounds from the olive flesh. In general, the resin and the olive flesh are kept in contact for anywhere from about 1 day to about 120 days. The resin and the olive flesh can be kept in contact, for example, for about 1, 2, 3, 4, 5, 6, 7, 14, 21, 28, 30, 40, 50, 60, 70, 80, 90, 100, 110, or 120 days. In some embodiments, contacting the olive flesh and the granular polymeric resin is performed for a period of time from about 15 days to about 120 days. In some embodiments, contacting the olive flesh and the granular polymeric resin is performed for a period of time from about 15 days to about 60 days. The mixture of olive flesh and resin can be mechanically agitated during any period of the contacting step, including the whole period. The mixture can also be sonicated for varying lengths of time. For example, the mixture of olive flesh and resin can be sonicated for about 15 minutes at the beginning of the contacting step, or intermittently during the contacting step. Olives can also be sonicated prior to addition of the resin. Alternatively, the olives can be electroporated for varying lengths of time prior to or during the contacting step.

Any suitable amount of resin can be used in the methods of the invention. In general, the amount of resin is determined based, in part, on the type of olive and resin used in the method, as well as on the quantity of bittering compounds that are to be removed from the olive flesh and the length of time that is targeted for processing. In some embodiments, the invention provides methods for debittering olives as described above wherein the ratio of the olive flesh to the granular polymeric resin is from about 10:1 to about 1:10 by weight. The ratio of olive flesh to resin can be, for example, from about 5:1 to about 1:5 by weight, or from about 4:1 to about 1:4 by weight, or from about 2:1 to about 1:2 by weight. The ratio of olive flesh to resin can be about 10:1, or about 9:1, or about 8:1, or about 7:1, or about 6:1, or about 5:1, or about 4:1, or about 3:1, or about 2:1, or about 1:1, or about 1:2, or about 1:3, or about 1:4, or about 1:5, or about 1:6, or about 1:7, or about 1:8, or about 1:9, or about 1:10 by weight. Other ratios can be useful in the methods of the invention.

The methods of the invention can further include additional processing steps that can promote adsorption of bittering compounds to the polymeric resin. Olive flesh can be frozen and thawed during the method, for example, or incised or otherwise cut during the method. Resin that is saturated or partially saturated with bittering compounds can be replaced with fresh resin. Any portion of the resin can be replaced, including the entirety of the resin. Such steps can be conducted at any point in the methods of the invention. Olives can be frozen, cut, incised, sonicated, or electroporated prior to addition of the polymeric resin. Alternatively, olives can be frozen and thawed while the olives and resin are kept in contact. Two or more of these steps can be conducted in combination. One or more portions of resin can be replaced with fresh resin at various points during the contacting step. In some embodiments, the methods as described above further include mechanically incising whole olives prior to contacting with the granular polymeric resin. In some embodiments, the methods further include freezing the olive flesh prior to contacting the olive flesh with the granular polymeric resin and allowing the olive flesh to thaw during the contacting step. In some embodiments, the methods further include sonicating the whole olives prior to contacting the olive flesh with the granular polymeric resin. In some embodiments, the methods further include electroporating whole olives prior to contacting the olive flesh with the granular polymeric resin. In some embodiments, the methods further include replacing one or more portions of the resin during the contacting step.

In some embodiments, the methods as described above further include removing the resin from the olive flesh. Any suitable means of separating the olives from the resin can be used in the methods of the invention following removal of the desired amount of bittering compounds from the olive flesh. In general, separating the olives from the resin includes one or more filtration steps using filters that retain one component of an olive/resin mixture (e.g., the olives) while excluding another component (e.g., the resin). The olive/resin mixture can be suspended in water, a buffer, or a non-toxic solvent to aid in passing the mixture through one or more filters. In some embodiments, removing the resin from the olive flesh includes: i) forming a mixture containing the olive flesh, the polymeric resin, and water; and ii) passing the mixture through a first filter to recover the olives from the mixture; thereby providing an aqueous resin mixture containing one or more bittering compounds adsorbed to the polymeric resin.

Certain bittering compounds, including oleuropein and hydroxytyrosol, are known to provide health benefits including lowering of cholesterol and protecting against myocardial infarction and atherosclerosis. As such, it is desirable in some instances to recover the bittering compounds removed from the olive flesh for administration (e.g., as a dietary supplement) to humans or other subjects. In general, recovering the bittering compounds involves eluting the compounds from the polymeric resin to which they are adsorbed. The bittering compounds are eluted from the polymeric resin using a solvent. Any suitable solvent can be used to elute the bittering compounds from the resin. Polar solvents are particularly useful. Suitable solvents include, but are not limited to, water, ethanol, isopropanol, glycerol, propylene glycol, and the like. Suitable solvents can be used alone or combined as mixtures. Preferably, the bittering compounds are sufficiently soluble in the solvent so as to be easily eluted from the polymeric resin. Preferably, the solvent is sufficiently volatile to be easily removed from the eluted bittering compound by, e.g., evaporation under reduced pressure. Elution can be conducted for any suitable time, ranging from a few minutes to several hours. Elution can be conducted, for example, for from about 10 minutes to about 24 hours, or from about 30 minutes to about 12 hours, or from about 1 hour to about 6 hours, or from about 3 hours to about 6 hours. Elution can be conducted for about 1, 2, 3, 4, 5, 6, 8, 10, 12, 18, or 24 hours. Elution can be conducted at room temperature (i.e., about 25° C.), or at an elevated temperature to promote elution. Elution can be conducted, for example, at about 30° C., or about 40° C. Other temperatures can be useful for eluting the bittering compounds from the resin, depending in part on the physical characteristics of the specific resin and solvent used in the method.

Accordingly, some embodiments of the invention provide methods as described above, further including: iii) passing the aqueous resin mixture through a second filter to recover the resin; iv) adding a polar solvent to the resin; v) mixing the polar solvent and the resin under conditions sufficient to elute one or more compounds from the resin; vi) passing the resin mixture through a third filter to remove the resin; and vii) removing the polar solvent; thereby isolating the one or more bittering compounds. In some embodiments, the mixing step is conducted at room temperature for about 3 hours to about 6 hours. In some embodiments, the polar solvent is ethanol.

Olive flesh, including whole olives, can be processed according to the methods of invention so as to remove varying levels of bittering compounds. The extent of removal will depend, in part, on the flavor profile desired in the processed product, or on the amount of isolated compounds desired for formulation of a health product such as a dietary supplement. The extent of debittering can be determined by a number of methods. Debittering levels can be determined, for example, by quantifying a bittering compound such as a polyphenol in an olive sample. Quantifying the bittering compound can be conducted by an analytical technique such as thin-layer chromatography, liquid chromatography with UV-visible absorption spectroscopy or mass spectrometry, or gas chromatography with mass spectrometry. A sample can be obtained by extracting bittering compounds from olive flesh using a suitable solvent such as dichloromethane or a methanol/water mixture. Alternatively, quantifying the level of debittering can be conducting by quantifying the bittering compounds adsorbed to the resin using the same analytical techniques. The extent of debittering can also be determined by simply tasting a sample of the olive flesh. In general, the amount of a given compound removed from the olive flesh ranges from a few tenths of a percent to the entirety of the compound. In some embodiments, from about 1% to about 99% of one or more bittering compounds is removed from the olive flesh. For example, from about 20% to about 80%, or from about 40% to about 60%, of a bittering compound can be removed. About 5%, 10%, 15%, 20%, 25%, 30%, 35%, 40%, 45%, 50%, 55%, 60%, 65%, 70%, 75%, 80%, 85%, 90%, or 95% of a bittering compound can be removed. In some embodiments, about 60% of one or more bittering compounds is removed from the olive flesh. In some embodiments, at least about 90% of one or more bittering compounds is removed from the olive flesh.

Advantageously, the extraction of bittering compounds from olive flesh according to the methods of the invention is conducted in the absence of large quantities of water. This eliminates the need for disposal of large amounts of aqueous waste solutions, which can be cumbersome and expensive because the water cannot be easily disposed of, such as via evaporation. Aqueous-based brines, containing lye or salt, can be avoided, providing health benefits which are particularly advantageous for consumers who require low-sodium foods. The methods can also provide olives with lower levels of carcinogens and other unwanted substances than conventional processing methods. Additionally, water-free processing methods allow for easy packing and transportation of olives (e.g., from orchard to cannery) during the debittering process. In some embodiments, the invention provides methods as described above wherein the contacting is performed under conditions that are substantially free of water. Small amounts of incident moisture, such as residual water from initial washing of olive fruit or condensation that collects during thawing of frozen olives, can be present. In general, however, the contacting step is conducted with a minimum of additional water. In preferred embodiments, the contacting step is conducted with no additional water.

As described above, the methods of the invention can provide debittered olives with lower sodium levels than conventionally-processed olive products. In some embodiments, the invention provides methods as described above wherein the contacting is performed under conditions that are substantially free of exogenous sodium. That is, the method is conducted without adding sodium-containing compounds such as sodium hydroxide (commonly referred to as "lye") or sodium chloride (commonly referred to as "salt"). In certain instances, the debittered olives processed according to the methods of the invention can contain no additional sodium than the olive flesh before processing. The debittered olives can contain, for example, less than 0.1% sodium by total weight. The debittered olives can contain, for example, less than 0.5% sodium or less than 0.25% sodium by total weight. In certain instances, the debittered olives processed according to the methods of the invention contain less sodium than conventionally processed olives. The debittered olives can contain, for example, less than 5% sodium, less than 4% sodium, less than 3% sodium, less than 2% sodium, less than 1% sodium, less than 0.5% sodium, or less than 0.1% sodium by total weight. Some embodiments of the invention provide an olive debittered according to the methods described above, wherein the sodium content of the debittered olive does not exceed the sodium content of unprocessed olive flesh used in the method for debittering olives.

IV. Examples

Example 1

Method for Non-Aqueous De-Bittering of Table Olives

Prior to debittering, a lot of olives is washed with water to remove surface dirt. The olives are mixed with one to ten parts, by weight, of an adsorptive polymeric resin (such as Amberlite XAD4, XAD7, or XAD16, FPX66, or a polyvinylpolypyrollidone resin). The resin and olives are mixed without the addition of extra aqueous medium.

A second lot of olives is mechanically incised on the outer surface prior to mixing with the resin. A third lot of olives is frozen for 24 hr, then mixed with the resin and allowed to thaw.

Portions of the olives are stored with the resin for 1 to 60 days. The levels of the polyphenolic compounds in the final products are found to vary depending on the length of time that the olives are stored with the resin. 30 days under static conditions, for example, leads to removal of 60% of the initial polyphenolic content. Certain portions of the olive mixture are mechanically agitated during storage with the resin. Other portions are sonicated for 15 min in the beginning of the process to achieve a more rapid debittering. During the time that the olives stay in contact with the resin, the bitter olive constituents (mainly oleuropein and other secoiridoid polyphenols) diffuse from the olive fruit and adsorb to the surface of the resin. Debittering is sped up by replacing portions of the resin with fresh resin every 7 days for certain lots of olives.

After the completion of the adsorption procedure, the resin is separated from the olives and regenerated. More specifically, the resin is separated by coarse filtration and mixed with an equal volume of ethanol and mechanically stirred for a 12 hrs. Then, the resin is separated by filtration, and the ethanol is evaporated under reduced pressure to afford the final table olive extract. The extract is a solid with oleuropein content range from 1% to 20% by weight. Other polar solvents can be used for elution of the adsorbed compounds. The volume of solvent and the mixing time can be varied, depending on the size of the resin batch and the quantity of bittering compounds adsorbed to the resin.

A second batch of resin is regenerated in a column by pumping ethanol at 3-6 BV/h. Finally, the regenerated resin is thoroughly washed with water and after drying is ready to be used again.

Example 2

Method for Assisting Aqueous De-Bittering Table Olives

Olive fruit is washed with water to remove surface dirt and placed in an appropriate brine storage solution. Adsorptive resin is added to this brine storage solution to enhance diffusion rates of oleuropein, other secoiridoid polyphenols, and polyphenols during storage. The olives are processed using commercial processing techniques, or are processed with the water-free method described above. Sonication is conducted to facilitate the diffusion of bitter compounds from the olive flesh.

Resins may also be used to enhance the lye processing method. Olives are treated with several lye washing steps to remove the bitter components. This can occur directly after harvest or after brine storage for up to 3 years. The absorptive resins can be added to any of the lye processing solution to enhance diffusion rates of oleuropein, other secoiridoid polyphenols, and polyphenols during lye treatment. The olives are processed using commercial processing techniques, or are processed with the water-free method described above.

Example 3

Monitoring the Levels of the Adsorbed Compounds

The levels of the polyphenols and secoiridoids either in the processed olive fruit or in the isolated olive extract can be monitored by liquid chromatography with mass spectrometry (LC/MS). More specifically, a chromatographic method permitting the monitoring of 20 different chemical constituents of olives has been developed. A sample of olives is removed from the debittering tank, pitted, mashed, and extracted with methanol/water in ultrasonic bath for 45 min. The extract is filtered and analyzed using an R-18 column with water/acetonitrile as mobile phase. The selected chemical compounds are monitored by MS/MS fragmentation.

Example 4

Health Benefits of Olive Extract

The enriched obtained extract can be used as an ingredient in functional foods or as a food supplement. The extracts are characterized by a similar chemical profile as the initial olive fruit. They are enriched in oleuropein and hydroxytyrosol which are known compounds for their health protecting activity due to their reported cholesterol lowering effect and ability to protect against myocardial infarction and atherosclerosis.

Example 5

Analysis of Bittering Compounds in Olives Treated with Polymeric Resins

Example 5.1

Olive fruits (Throuba variety, 500 gr, maturity index 1-2) were collected and placed in airtight glass jars with 500 g or 250 g resin. Resin types tested were XAD4 (polystyrene), Divergan S (polyvinylpyrrolidone), and FPX66 (food grade FDA approved). The olives were placed in layers in the order resin/olives/resin/olives/resin. After 20 or 40 days a portion of olive fruit was removed, washed with water, and pitted. A portion of the flesh (3 g) was mashed and extracted with 25 mL (MeOH/$H_2O$ 4:1) in an ultrasonic bath for 45 min. Then hexane (25 mL) was added and the mixture was centrifuged at 4000 rpm for 10 min. The upper layer of hexane was removed and the MeOH phase was separated from the solid residue and collected for analysis by LC/MS or NMR.

Example 5.2

Olive fruits (Throuba variety, 500 gr, maturity index 1-2) were collected, incised bilaterally with a knife, and placed in airtight glass jars with 500 g or 250 g resin (FPX66, XAD4, or Divergan S). After 20 or 40 days a portion of olive fruits was removed, washed with water, and pitted. The olive flesh was extracted as described above.

Example 5.3

Olive fruits (Mission variety, 500 gr, maturity index 5-7) were collected, incised bilaterally with a knife, and placed in airtight glass jars with 500 g or 250 g resin (FPX66 or XAD4). After 10 days a portion of olive fruit was removed, washed with water, and pitted. The flesh was extracted as described above.

Analysis by NMR

A portion of the MeOH phase (5 mL) was mixed with a solution of standard syringaldehyde (500 µL, 1 mg/mL) and evaporated. The residue was dissolved in deuterated methanol (MeOD, 750 µL) and transferred to the NMR tube for measurement. NMR spectra were recorded using 16 scans at 400 MHz. The peaks of interest were integrated by setting the integration of the syringaldehyde peak at 9.8 ppm to 1, and species were quantified using calibration curves constructed with pure analytical standards.

Analysis by LC/MS

A portion of the MeOH phase (1 mL) was filtered (0.2 µm) and diluted 1:50 with water. The final solution was injected (1 µl) on an LC-MS (Agilent QQQ 6460) equipped with a reverse phase column (Poroshell 120 EC-$C_{18}$ 2.1×150 mm, 2.7 micron) and eluted with the gradient program described in Table 1 at a flow rate of 0.4 mL/min.

TABLE 1

HPLC gradient program used to separate olive phenolics.

| Time (min) | % Solvent A: 0.1 formic acid in Water | % Solvent B: Acetonitrile |
|---|---|---|
| 0 | 90 | 10 |
| 2.5 | 90 | 10 |
| 3 | 75 | 25 |
| 6 | 75 | 25 |
| 7.5 | 60 | 40 |
| 8.5 | 5 | 95 |
| 9.5 | 5 | 95 |

The MS analysis was performed with dynamic MRM. Precursor and product ions as well as other MS parameters described in Table 2.

TABLE 2

MS scanning parameters used in the identification and quantification of olive phenolics.

| Peak | Compound Name | Mass | Precursor Ion | Product Ion | Fragmentor Voltage | Collision Energy | Retention Time | Polarity |
|---|---|---|---|---|---|---|---|---|
| 1 | Hydroxytyrosol 4-O-glucoside | 316.12 | 315 | 153 | 115 | 12 | 1.55 | Neg. |
| 1 | Hydroxytyrosol 4-O-glucoside | 316.12 | 315 | 123 | 115 | 38 | 1.55 | Neg. |
| 2 | Hydroxytyrosol | 154.06 | 153.1 | 123 | 100 | 8 | 2.15 | Neg. |
| 3 | Salidroside | 300.12 | 345.1 | 299.1 | 90 | 4 | 2.45 | Neg. |
| 3 | Salidroside | 300.12 | 345.1 | 207.5 | 90 | 12 | 2.45 | Neg. |
| 4 | 2,6-Dimethoxy-p-benzoquinone | 168.04 | 169 | 141 | 110 | 12 | 3.4 | Pos. |
| 4 | 2,6-Dimethoxy-p-benzoquinone | 168.04 | 169 | 126 | 110 | 16 | 3.4 | Pos. |
| 5 | Chlorogenic acid | 354.1 | 353.1 | 191 | 95 | 12 | 3.9 | Neg. |
| 6 | Oleoside methyl ester | 404.13 | 403 | 223 | 90 | 10 | 4.25 | Neg. |
| 7 | Rutin | 610.15 | 609.1 | 271 | 220 | 68 | 4.55 | Neg. |
| 7 | Rutin | 610.15 | 609.1 | 300 | 220 | 40 | 4.55 | Neg. |
| 8 | Verbascoside | 624.21 | 623.2 | 161 | 210 | 36 | 4.65 | Neg. |
| 9 | Luteolin-7-O-glucoside | 448.1 | 447.1 | 285 | 135 | 16 | 5.55 | Neg. |
| 10 | Oleuropein | 540.18 | 539.2 | 307 | 165 | 16 | 6.3 | Neg. |
| 10 | Oleuropein | 540.18 | 539.2 | 275.1 | 165 | 20 | 6.3 | Neg. |
| 11 | Oleuropein aglycon aldehyde form | 378.13 | 377.1 | 275.1 | 105 | 4 | 8.95 | Neg. |
| 11 | Oleuropein aglycon aldehyde form | 378.13 | 377.1 | 307 | 105 | 4 | 8.95 | Neg. |
| 12 | Ligstral | 362.14 | 361.1 | 291.1 | 95 | 8 | 9.18 | Neg. |
| 12 | Ligstral | 362.14 | 361.1 | 259.1 | 95 | 4 | 9.18 | Neg. |
| 13 | Tyrosol | 138.07 | 139.1 | 121 | 75 | 8 | 1.1 | Pos. |
| 14 | trans-Caffeic acid | 180.04 | 179 | 135 | 95 | 12 | 6.9 | Neg. |
| 15 | o-Coumaric acid | 164.05 | 163 | 119 | 80 | 8 | 6.6 | Neg. |
| 15 | o-Coumaric acid | 164.05 | 163 | 117 | 80 | 28 | 6.6 | Neg. |

Calibration curves were constructed for oleuropein, methyl oleoside and hydroxytyrosol using pure analytical standards.

Analytical Results

Example 5.1

The effect of using XAD4 or FPX66 to reduce oleuropein concentrations in whole olives is given in Table 3. With no resin, the oleuropein levels decreased from 10,425±52 µg/g to 9,168±36 µg/g over 40 days. Use of the FPX66 resin, however, resulted in a drop to 4.3±0.1 µg/g after 40 days. Use of the XAD4 resin reduced levels to 7.6±0.1 µg/g, and use of the Divergan resin reduced levels to 3,281±15 µg/g after 40 days.

TABLE 3

The effect of XAD4 or FPX66 on oleuropein, hydroxytyrosol and methyl oleoside concentrations in whole olives.

| | Incubation time (days) | Resin | Oleuropein µg/g | Hydroxytyrosol µg/g | Methyl-oleoside µg/g |
|---|---|---|---|---|---|
| no incision | 0 | | 10,425 ± 52 | 175.8 ± 0.7 | 6,212 ± 31 |
| no incision | 20 | | 7,964 ± 27 | 0 | 13,422 ± 55 |

TABLE 3-continued

The effect of XAD4 or FPX66 on oleuropein, hydroxytyrosol
and methyl oleoside concentrations in whole olives.

| | Incubation time (days) | Resin | Oleuropein µg/g | Hydroxytyrosol µg/g | Methyl-oleoside µg/g |
|---|---|---|---|---|---|
| no incision | 40 | | 9,168 ± 36 | 0 | 14,714 ± 75 |
| no incision | 20 | FPX66 | 8,905 ± 26 | 39.7 ± 0.2 | 10,853 ± 65 |
| no incision | 40 | FPX66 | 4.3 ± 0.1 | 12.8 ± 0.1 | 0 |
| no incision | 20 | XAD4 | 1,144 ± 4 | 0 | 4,218 ± 21 |
| no incision | 40 | XAD4 | 7.6 ± 0.1 | 0 | 3,418 ± 15 |
| no incision | 40 | Divergan | 3,281 ± 15 | 28.4 ± 0.2 | 9,293 ± 35 |

Values are expressed as mean ± SD (three measurements of each sample)

Example 5.2

The effect of FPX66, XAD4, and Divergan to reduce oleuropein concentrations in whole olives with incisions is shown in Table 4. With no resin, the oleuropein levels decreased negligibly in the incised olives from 10,425±52 µg/g to 8,809±30 µg/g over 20 days. Treatment with the FPX66 and XAD4 resins, meanwhile, resulted in a reduction of oleuropein to 40.5±0.2 and 35±0.1 µg/g, respectively. Levels continued to decrease over the 40 days to 11±0.1 and 14.6±0.2 µg/g, respectively. In contrast, Divergan did not result in a significant reduction in the oleuropein content. The results also show that minor incisions in the olives prior to resin treatment enhance the removal of the olive phenolics by the resins.

TABLE 4

The effect of XAD4 or FPX66 on oleuropein, hydroxytyrosol
and methyl oleoside concentrations in whole incised olives.

| | days | Resin | Oleuropein µg/g | Hydroxytyrosol µg/g | Methyl oleoside µg/g |
|---|---|---|---|---|---|
| incision | 0 | | 10425 ± 52 | 175.8 ± 0.7 | 6212 ± 31 |
| incision | 20 | | 8809 ± 30 | 37 ± 0.2 | 8990 ± 39 |
| incision | 40 | | 4977 ± 25 | 24.4 ± 0.3 | 9354 ± 40 |
| incision | 20 | FPX66 | 40.5 ± 0.2 | 33 ± 0.2 | 9012 ± 40 |
| incision | 40 | FPX66 | 11 ± 0.1 | 7 ± 0.1 | 211 ± 0.8 |
| incision | 20 | XAD4 | 35 ± 0.1 | 0 | 1105 ± 4 |
| incision | 40 | XAD4 | 14.6 ± 0.2 | 0 | 371 ± 1.8 |
| incision | 20 | Divergan | 8507 ± 32 | 17 ± 0.1 | 8897 ± 37 |
| incision | 40 | Divergan | 4677 ± 23 | 84.4 ± 0.3 | 9854 ± 43 |

These results were confirmed by NMR data, which is shown in FIG. 1.

Example 5.3

Figure 2:
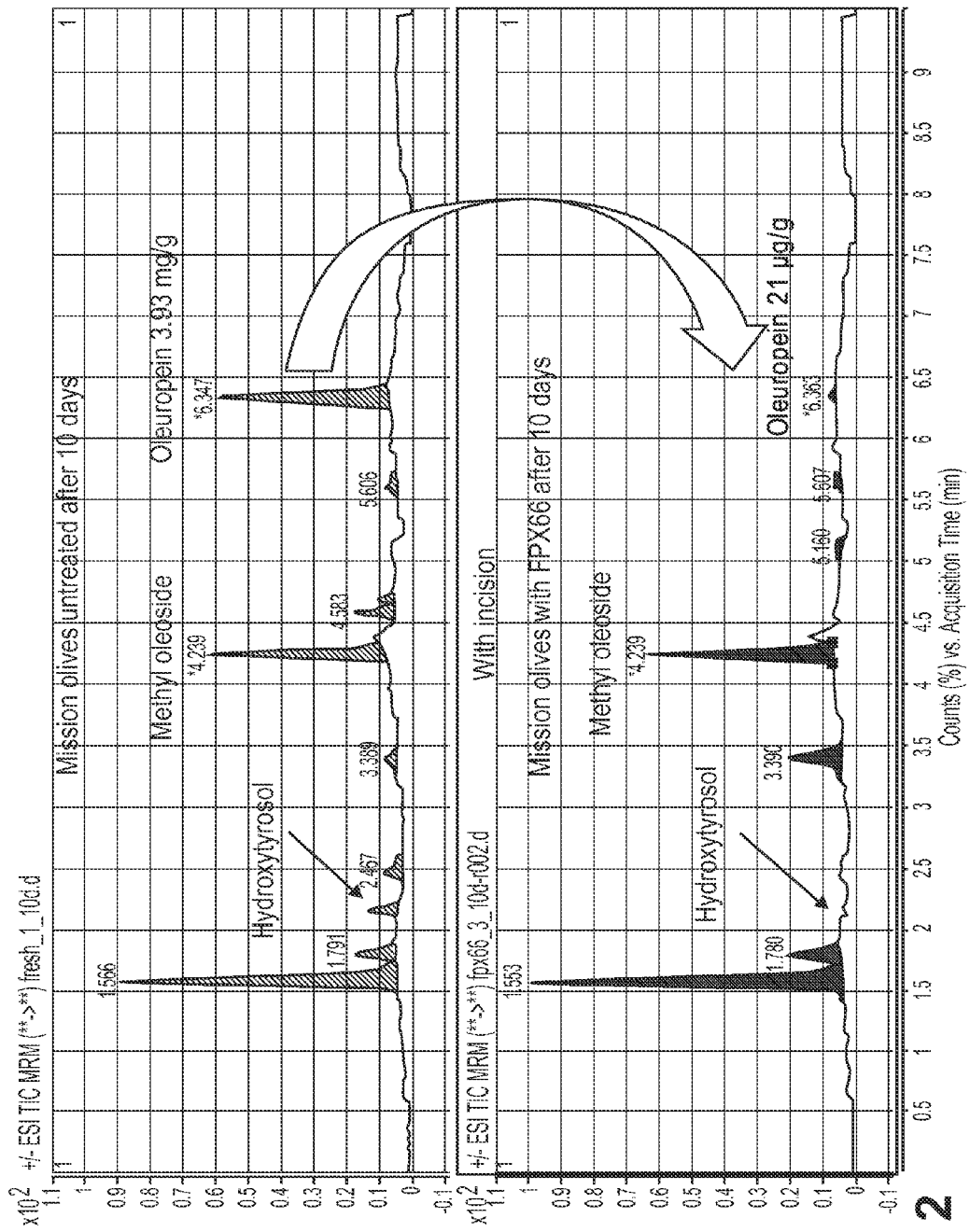
FIG. 2 shows levels of oleuropein, methyl oleoside, hydroxytyrosol, hydroxytyrosol glucoside, dimethoxybenzoquinone, rutin, verbascoside and luteolin glucoside in incised olives treated with FPX66 resin for 10 days.

As is shown in FIG. 2, using incubation of incised olives for 10 days with FPX66 resin resulted in a decrease of oleuropein from 3.93 mg/g flesh to 21 µg/g. Significant quantities of other compounds (e.g. methyl oleoside or hydroxytyrosol glucoside, which are known to have beneficial biological activities) are still present, but oleuropein is almost quantitatively removed and the olives present significantly reduced bitterness. As such, the method provides a better tasting olive without a loss of nutritional value.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A method for debittering olive flesh, the method comprising contacting the olive flesh with a granular polymeric resin under conditions sufficient to remove one or more bittering compounds from the olive flesh, wherein the olive flesh is selected from the group consisting of whole olives, olive slices, and combinations thereof, thereby debittering the olive flesh.

2. The method of claim 1, wherein the olive flesh comprises whole olives.

3. The method of claim 1, wherein the olive flesh comprises olive slices.

4. The method of claim 1, wherein the one or more bittering compounds are selected from the group consisting of phenols, polyphenols, and secoiridoids.

5. The method of claim 1, wherein the granular polymeric resin is selected from the group consisting of a polystyrene/poly(divinylbenzene) resin, an acrylic ester resin, and a polyvinylpolypyrrolidone resin.

6. The method of claim 1, wherein the contacting is performed for a period of time from about 1 day to about 120 days.

7. The method of claim 1, wherein the ratio of the olive flesh to the granular polymeric resin is from about 10:1 to about 1:10 by weight.

8. The method of claim 2, further comprising mechanically incising the whole olives prior to contacting with the granular polymeric resin.

9. The method of claim 1, further comprising freezing the olive flesh prior to contacting the olive flesh with the granular polymeric resin and allowing the olive flesh to thaw during the contacting step.

10. The method of claim 2, further comprising sonicating the whole olives prior to contacting the olive flesh with the granular polymeric resin.

11. The method of claim 2, further comprising electroporating the whole olives prior to contacting the olive flesh with the granular polymeric resin.

12. The method of claim 1, further comprising replacing one or more portions of the resin during the contacting step.

13. The method of claim 1, further comprising removing the resin from the olive flesh.

14. The method of claim 13, wherein removing the resin from the olive flesh comprises
   i) forming a mixture comprising the olive flesh, the polymeric resin, and water; and ii) passing the mixture through a first filter to recover the olive flesh from the mixture;
thereby providing an aqueous resin mixture comprising one or more bittering compounds adsorbed to the polymeric resin.

15. The method of claim 14, further comprising:
iii) passing the aqueous resin mixture through a second filter to recover the resin;
iv) adding a polar solvent to the resin;
v) mixing the polar solvent and the resin under conditions sufficient to elute one or more bittering compounds from the resin;
vi) passing the resin mixture through a third filter to remove the resin; and
vii) removing the polar solvent;
thereby isolating the one or more bittering compounds.

16. The method according to claim 1, wherein from about 1% to about 99% of the one or more bittering compounds is removed from the olive flesh.

17. The method according to claim 1, wherein the contacting is performed under conditions that are substantially free of water.

18. The method according to claim 1, wherein the contacting is performed under conditions that are substantially free of exogenous sodium.

19. Olive flesh debittered according to the method of claim 1.

20. The method according to claim 1, wherein the granular polymeric resin is a polystyrene/poly(divinylbenzene) resin.

21. The method according to claim 1, wherein the contacting is performed for a period of time from about 15 days to about 120 days.

22. A method comprising contacting the olive flesh with a granular polystyrene/poly(divinylbenzene) resin for at least about 7 days under conditions sufficient to remove at least about 60% of oleuropein from the olive flesh, wherein the olive flesh is selected from the group consisting of whole olives, olive slices, and combinations thereof, and wherein the ratio of olive flesh to resin is from about 4:1 to about 1:4 by weight, thereby debittering the olive flesh.

23. The method according to claim 22, wherein the contacting is performed for a period of about 40 days.

24. The method according to claim 22, wherein the olive flesh comprises whole olives.

25. The method according to claim 24, wherein the whole olives comprise pits.

26. The method according to claim 24, further comprising incising the whole olives prior to contacting with the granular polystyrene/poly(divinylbenzene) resin.

27. The method according to claim 1, wherein the olive flesh comprises ascolano olive flesh, barouni olive flesh, cailletier olive flesh, frantoio olive flesh, Kalamata olive flesh, lucques olive flesh, manzanillo olive flesh, Mission olive flesh, sevillano olive flesh, throuba olive flesh, or a combination thereof.

28. The method according to claim 22, wherein the olive flesh comprises ascolano olive flesh, barouni olive flesh, cailletier olive flesh, frantoio olive flesh, Kalamata olive flesh, lucques olive flesh, manzanillo olive flesh, Mission olive flesh, sevillano olive flesh, throuba olive flesh, or a combination thereof.

* * * * *